(12) United States Patent  (10) Patent No.: US 6,649,850 B2
Strohmeier  (45) Date of Patent: Nov. 18, 2003

(54) SPRING SCALE (75) Inventor: Rolf Martin Strohmeier, Baar (CH)

(73) Assignee: Pesola Prazisionswaagen AG, Baar (CH)

( * ) Notice: Subject to any disclaimer, the term of this patent is extended or adjusted under 35 U.S.C. 154(b) by 116 days.

(21) Appl. No.: 09/964,539

(22) Filed: Sep. 28, 2001

(65) Prior Publication Data

US 2002/0070054 A1 Jun. 13, 2002

(30) Foreign Application Priority Data

Sep. 29, 2000 (CH) .................... 2000 1912/00

(51) Int. Cl.⁷ .................................. G01G 3/02
(52) U.S. Cl. ........................ 177/232; 177/233
(58) Field of Search ................. 177/232, 233

(56) References Cited

U.S. PATENT DOCUMENTS

| | | | | |
|---|---|---|---|---|
| 67,482 A | * | 8/1867 | Barker ................. | 177/232 |
| 273,720 A | * | 3/1883 | George ................. | 177/232 |
| 739,035 A | * | 9/1903 | Triner ................. | 177/232 |
| 756,175 A | * | 3/1904 | Meisselabach et al. ..... | 177/232 |
| 1,063,242 A | * | 6/1913 | Catucci ................ | 177/232 |
| 1,095,735 A | * | 5/1914 | Lupton ................ | 177/232 |
| 4,964,479 A | | 10/1990 | Sumida | |
| 6,246,017 B1 | * | 6/2001 | Yang ................... | 177/233 |

FOREIGN PATENT DOCUMENTS

| | | |
|---|---|---|
| EP | 365837 | 5/1990 |
| GB | 643830 | 9/1950 |
| GB | 2205169 | 11/1988 |

* cited by examiner

Primary Examiner—Randy Gibson
(74) Attorney, Agent, or Firm—Burns, Doane, Swecker & Mathis, L.L.P.

(57) ABSTRACT

The spring scale according to present invention comprises an outer tube (1), an inner tube (4) with an O-ring (7), an end eye (20), a spring holder (9), a spiral spring (11), a set screw (13), a hanger (19), a holder bearing (35) as well as a cover (41) with spur (42).

13 Claims, 6 Drawing Sheets

SPRING SCALE

This application claims priority under 35 U.S.C. §§119 and/or 365 to Swiss Patent Application No. 2000 1912/00 filed in Switzerland on Sep. 29, 2000; the entire content of which is hereby incorporated by reference.

DESCRIPTION OF THE PRIOR ART

Conventional spring scales with double tube technology have a non transparent outer tube with a slit with graduations along its sides. An inner tube with a protruding cam is inserted into an outer tube. The cam has marking functions while moving up and down in the graduation slit. This protruding cam may have frictions on the slit rims and thus may adulterate the measurement results. This protruding cam hinders the free rotation of the inner tube.

Through this slit impurities may get into the interior of the spring scale and can affect proper function.

The measurement graduation may only be read in the range of the slit.

Due to reasons of the measuring accuracy and stability such spring scales must almost conclusively have an outer tube made of metal, in particular made of aluminum. The manufacturing, the cutting of one or two threads, the printing and the colouring as well as the cutting of the slit on the outer tube are factors, which increase the price of the final product substantially.

The suspension clip or the hook attached to the spring scale for holding the weighing goods must be able to swivel freely, in order to avoid torsion and friction of the protruding cam in the slit of the outer tube. Such a mounting increases the price of the spring scale.

In conventional spring scales with double tube technology the set screw, as mentioned in the describing part of the independent claim, is screwed into a mounting support.

The regulating range of the spring bearing on the set screw can not be limited to one side, whereby it is possible that the set screw can be completely unscrewed from the spring bearing and thus the spring scale may completely lose its operability.

OBJECTS OF THE INVENTION

It is an object of the present invention to provide a spring scale which has no graduation slit in its outer tube and which has no corresponding protruding cam with marking function on its inner tube.

It is a further object of the present invention to provide a spring scale in which a spring holder and all elements connected to it in a non swivelling manner, with or without weighing goods attached, whereby the spring holder itself shall be freely swivellable, without hindering the zero point adjustment and the tare function.

It is a further object of the present invention to provide a spring scale in which the regulating range of a holder bearing on the set screw is limited on both sides.

This holder bearing shall have an inner thread and shall be, due to the presence of a spur, non swivellable and axially guided.

This spring scale shall have a closed outer tube which protects the inner technology from contamination.

It is a further object of the present invention to provide a spring scale with individual parts which are to be produced in an economic way and are easy to assemble.

It is a further object of the present invention to provide a spring scale which shall be precisely adjustable and shall be of easy and safe operation.

It is a further object of the present invention to provide a spring scale which is, by its construction, secured against involuntary disaggregation.

The cover and the outer tube of this spring scale shall in particular be connected to each other by means of gluing or welding in such a manner that non-destructive disaggregation is not possible.

The space provided for the spiral spring shall be dimensioned in such a way that a spiral spring with a favourable winding ratio may be used.

According to a preferred embodiment either the outer tube or the inner tube shall have imprinted or attached scales and inscriptions.

The outer tube shall especially be made of a material of low density and shall in its entirety be preparable in an easy, quick and low cost way.

The set screw shall especially rotate in an incremental way and thus be adjustable precisely and shall be protected against involuntary rotation.

SUMMARY OF THE INVENTION

With the present invention the above objects are achieved.

The present invention is defined in the independent claim.

PREFERRED EMBODIMENTS OF THE INVENTIONS

Preferred embodiments are characterized in the dependent claims.

In the following part are described possible embodiments of individual parts of the inventive device. Thereby reference is made to the figures.

Figure 8:
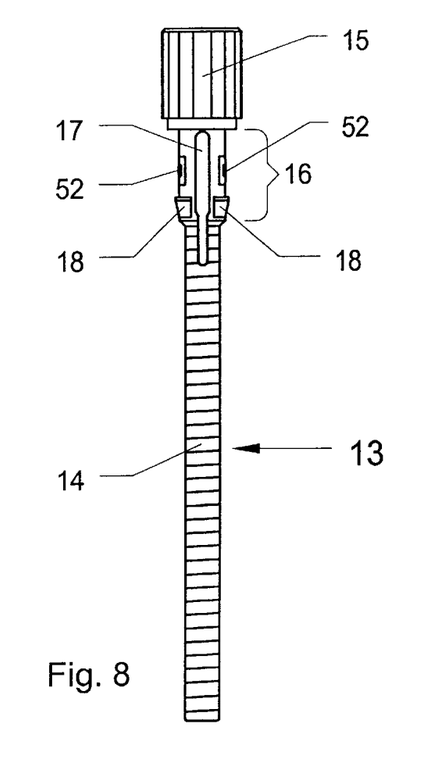
FIG. 8 shows a side view of a set screw 13.

The set screw 13 comprises a thread 14, a screw head 15 and a cylindrical section 16 which is located in-between said two parts.

The screw head 15 is handy shaped and is for example rough or grooved. It may have the form of a ball, a cone or a cylinder.

The screw head 15 may have on the side which is opposite to the thread 14 an axial and cylindrical sack hole.

The cylindrical section 16 has a slot-shaped recess 17, which imparts elastic characteristics to the remaining walls.

It is possible that the slot-shaped recess 17 protrudes also into a part of the adjacent thread 14.

The cylindrical section 16 has on the side which is oriented towards the thread 14 at least two opposite cams 18.

On the exterior of the remaining walls olives 52 may be present, which are protruding and opposite to each other.

The outside diameter of the screw head 15 at the transition to the cylindrical section 16 is larger than the outside diameter of the cylindrical section 16.

The outside diameter of the cylindrical section 16 at the transition to the thread 14 is larger or equal to the outside diameter of the thread 14.

Figure 9A:
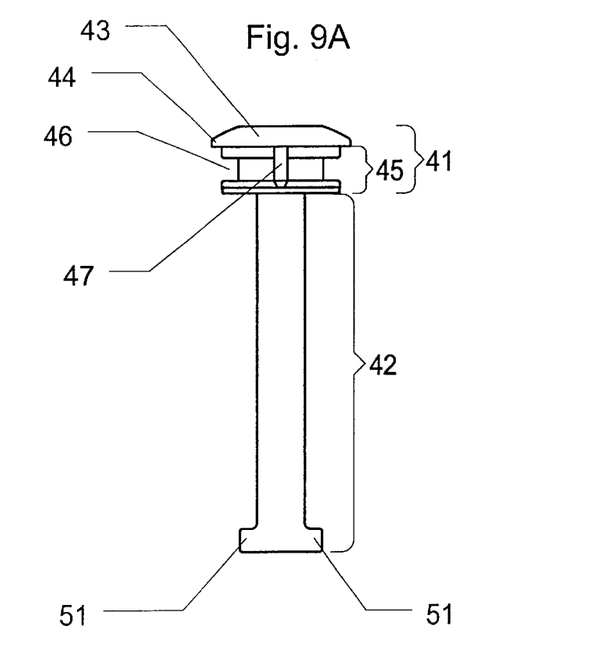
FIG. 9A shows a side view of a cover 41 with spur 42.
Figure 9B:
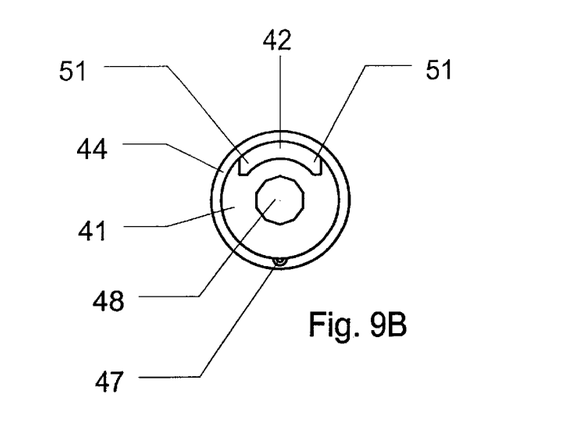
FIG. 9B shows a plan view of a cover 41 with spur 42.

The cover 41 with spur 42 has an end cap 43 with a protruding and circulating edge 44 and a cylindrical lower part 45.

The cylindrical lower part 45 has receding cavities 46, for example a circulating groove, and means 47 to avoid distortion, for example at least one bar 47, which protrudes the cylindrical lower part 45.

This protruding bar 47 interlocks in one of the existing and correspondingly shaped recesses in the inner wall of an outer tube 1.

The lower part 45 preferably has on its end opposite to the end cap 43 a circulating bevel which facilitates the insertion of the cover 41 with spur 42 into the outer tube 1.

The cover 41 has a continuous, axial and centric hole 48. This hole 48 may be shaped cylindrically or polygonally, for example ten-angularly.

Protruding olives 52 on the set screw 13 may fit into two opposite edges of this ten-angular hole 48 in the cover 41 and thus effect a gradual snapping during the rotation of the set screw 13.

The cover 41 comprises also a spur 42, which preferably is a part of the cover 41. This spur 42 is rod-shaped and parallel to the middle axis of the cover 41 and may be adapted to the form of the inner wall of an outer tube 1.

The side of the spur 42 which is oriented towards the longitudinal axis of the outer tube 1 may be shaped concentrically to the wall of the outer tube 1.

The width and the wall thickness of the spur 42 are preferably dimensioned in such a way that during torsion and/or tensile load neither a persisting deformation nor a rupture occur.

The end of the spur 42, which is opposite to the end cap 43, may have a thickening 51, which has the function of a stop gauge for the holder bearing 35.

It is also possible that the spur 42 is designed as individual part.

In this case the spur 42 must have on at least on end such a thickening 51, which interlocks in such a manner into a correspondingly shaped recess in the lower part 45 of the cover 41, that during a tensile load parallel to the longitudinal axis of the outer tube 1 no separation of cover 41 and spur 42 occurs.

The holder bearing 35 has a cylindrical basic form with a continuous axial and centric hole 36, which has different diameters along the middle axis of the holder bearing 35.

If the holder bearing 35 is produced by injection moulding processes—caused by the manufacturing process—either in the front side 53 or in the end surface 39 which both are rectangular to the middle axis of the holder bearing 35, at least one notch 54, in particular three notches 54, may be present.

The part of said continuous axial and centric hole 36, which is near to said notches 54, is preferably designed as cone.

The narrowest section of this cone changes into an inner thread 58, which extends over a part of said hole 36.

The inner thread 58 is limited by an U-shaped slot 37, which is rectangular to the middle axis of the holder bearing 35.

The center of the semi-circle of the U-shaped slot 37 is located on the middle axis of the holder bearing 35.

This U-shaped slot 37 is limited by an U-shaped smaller recess 38.

The center of the semi-circle of the U-shaped recess 38 is also located on the middle axis of the holder bearing 35.

The two thighs of the U-shaped slot 37 and the two thighs of the U-shaped recess 38 are all parallel. The U-shape of the slot 37 and the U-shape of the recess 38 open on the same side.

Thereby the radius of the U-shaped slot 37 is larger than the radius of the U-shaped recess 38.

One side of this U-shaped recess 38 forms the end surface 39 which is rectangular to the middle axis of the holder bearing 35.

The normally pointed edges of the U-shaped slot 37 and the normally pointed edges of the U-shaped recess 38, all located in the cylindrical outer wall of the holder bearing 35, may be all shortened or rounded for easier assembly.

A continuous channel 40 extends over the cylindrical outer wall of the holder bearing 35 and is parallel to its middle axis.

This channel 40 preferably has two opposite parallel, lateral delimitation surfaces.

This channel 40 may also have lateral and radially cut delimitation surfaces.

The non lateral delimitation surface of this channel 40 preferably has a concentric shape to the cylindrical basic shape of the holder bearing 35.

This channel 40 is preferably located in the middle of the opening of the U-shaped slot 37.

A circulating groove 55 may be cut into the cylindrical outer wall of the holder bearing 35.

Alternatively, according to a second variation, the inner thread 58 in the holder bearing 35 may be realised by an inserted multi-edged, for example a hexagonal, standard nut.

In this case this standard nut must be secured against rotation and tearing out by constructive means in the holder bearing 35.

Figure 1:
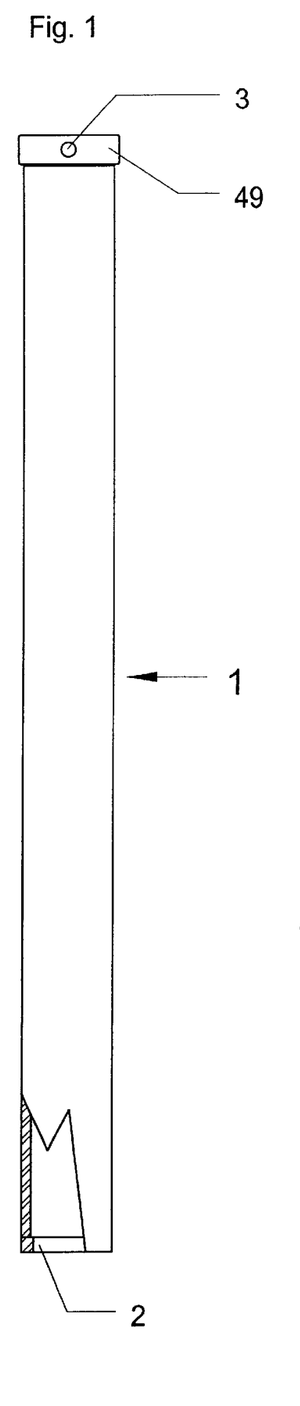
FIG. 1 shows a side view of an outer tube 1, whereby a part thereof is shown in a cut open form.

The outer tube 1 is preferably shaped cylindrically on its outer side and may have on one end a protruding, continuous collar 49 with reinforcement function.

Due to the preferred production with an injection moulding process, the outer tube 1 is slightly conical on its inside.

The inner diameter of the outer tube 1 is larger on the side of the collar 49 than on the opposite side.

Figure 2:
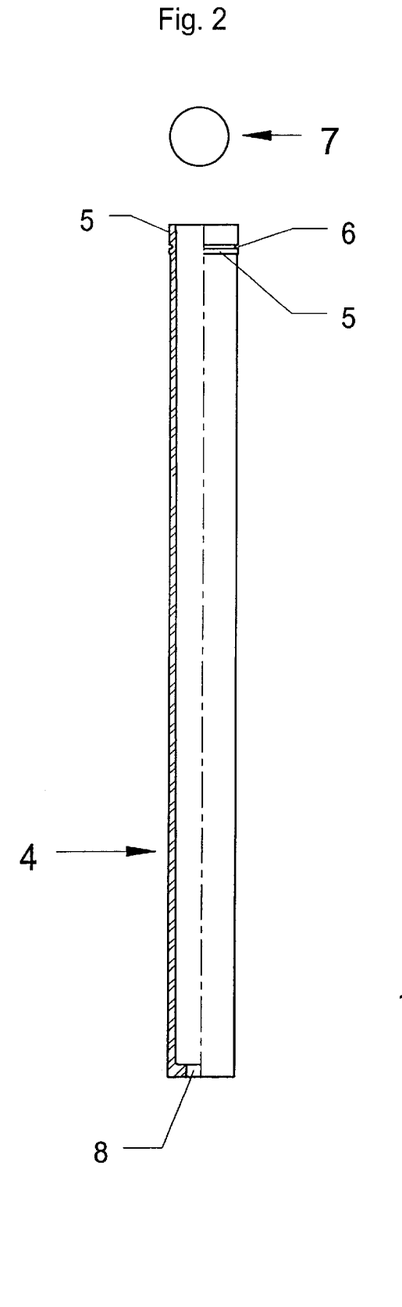
FIG. 2 shows a side view of an inner tube 4, whereby a part thereof is shown in a cut open form.

On the inside of this opposite side is located an additional circulating constriction 2, which has, together with the thickening 5 on the corresponding inner tube 4, the function of an overload safety device.

The collar 49 has two opposite holes 3 for the insertion of a hanger 19.

The collar 49 may have at least one positioning notch on its outside.

The inner wall of the collar 49 has means to avoid distortion, for example a recess for the insertion of a protruding bar 47 which is located at the cover 41.

The outer tube 1 is preferably made of transparent, thermoplastic material, for example polycarbonate (PC), and may have imprinted or attached scales and inscriptions.

Due to the preferred production in an injection moulding process, the inner tube 4 is slightly conical on its inside.

The inner tube 4 is cylindrical on its outer side and has on the end with the larger inside diameter a circulating, cylindrical, concentric thickening 5, which together with the constriction 2 at the outer tube 1 has the function of an overload safety device.

Into this thickening 5 a circulating groove 6 is cut in, which enables the insertion of an O-ring 7 with marking function.

On the end with the smaller inside diameter the inner tube 4 has a bottom, which has a centric hole 8.

The inner tube 4 is preferably made of a thermoplastic material, for example polyoxymethylene (POM), If the outer tube 1 is made of non-transparent material, the inner tube 4 may have imprinted or attached scales and inscriptions.

In this case the scale on the outside of the inner 4 tube is read at the lower edge of the outer tube 1.

Figure 3:
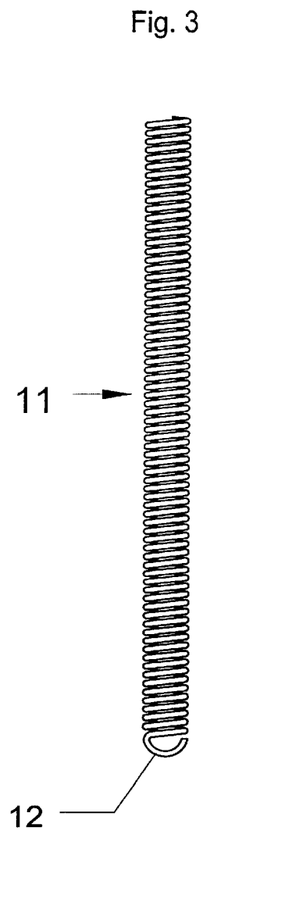
FIG. 3 shows a side view of a spiral spring 11.

As spring a cylindrical spiral spring 11 is used, which is on one side equipped with a semicircular eye 12.

The spiral spring 11 is preferably made of round wire with diameters from 0.2 mm to 1.0 mm, which correspond to weighing capacities from 10 g to 3000 g.

The spiral springs 11 preferably have lengths from 100 mm to 150 mm, in particular from 110 mm to 130 mm, in assembled vertical position without weighing goods attached.

The spring holder 9 has a cylindrical basic shape and has a cylindrical, axial drilling 32 in its interior.

The spring holder 9 has a circulating first flange 33 at one end.

This first flange 33 is followed by a first cylindrical section 34.

This first cylindrical section 34 is preferably followed by a second flange 50 and thereafter by a second cylindrical section 56.

It is preferred that the second flange 50 and the second cylindrical section 56 have each two parallel and with regard to the middle axis of the spring holder 9 symmetrically arranged flattenings 57, whereby the flattenings 57 at the second flange 50 only extend over a sub-range of its thickness and are followed by the first cylindrical section 34.

The first cylindrical section 34 or, if present, the second cylindrical section 56 serves for the parking of occasionally present, inactive surplus turns of the assembled and adjusted spiral spring 11.

The spring holder 9 has an outer thread 10 on its other end.

It is preferred that the spring holder 9 has at this end an insertion cylinder, which facilitates the insertion of the first winding of the spiral spring 11 and which extends form the beginning of the first turn of the outer thread 10 nearly up to the end of the first turn of the thread along the elevation of the first turn of the thread, whereby the outer diameter of this insertion cylinder is smaller than the inner diameter of the spiral spring 11.

The outer thread 10 preferably has a bevelled surface for easier insertion at its beginning.

The outer thread 10 preferably has three to four thread turns and preferably is slightly conic, whereby the smaller cone diameter is located at the bevelled surface for easier insertion.

The outer thread 10 goes over at its end either into the first cylindrical section 34 or, if present, into the second cylindrical section 56.

Figure 4A:
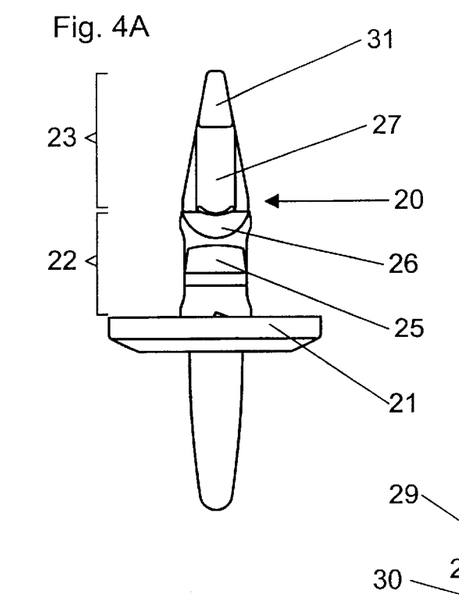
FIGS. 4A and 4B show side views of an end eye 20.
Figure 4B:
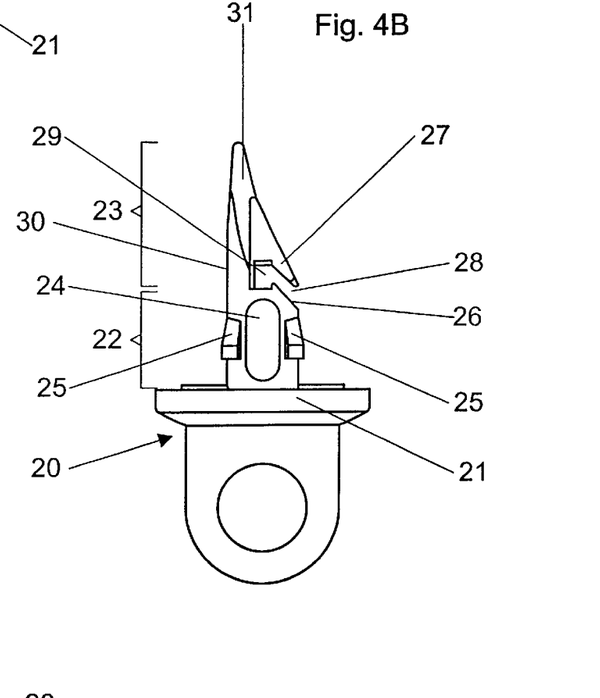
Figure 4C:
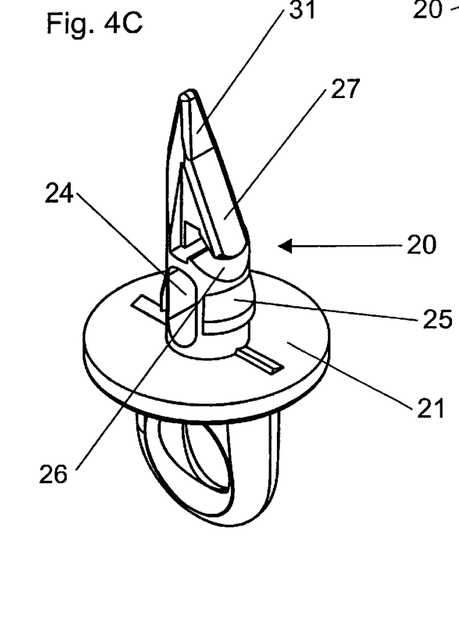
FIG. 4C shows an isometric view of an end eye 20.

The end eye 20 has a cylindrical disk 21.

The middle axis of the end eye 20 goes through the center of the cylindrical disk 21 and is rectangular to it.

On one side of the cylindrical disk 21 is located an element, which enables the mounting of a supporting device, for example a hook, clip.

This element preferably has the shape of an U-shaped strap with an opening.

The cylindrical disk 21 can be chamfered in direction of the U-shaped strap.

On the other side of the cylindrical disk 21 is located a cylindrical and concentric tap 22, which goes over into an asymmetrical hook tip 23.

This tap 22 has a slot-shaped recess 24 with for example rounded or angular ends.

At the outer side of the tap 22 are located at least two opposite cams 25, in particular two cams 25, whereby there is a spacing between the cams 25 and the cylindrical disk 21.

These cams 25 appropriately are wedge-shaped.

The remaining wall of the tap 22 with the cams 25 has elastic behaviour characteristics.

The tap 22 has an one sided bevel surface 26, which forms a cut 28 together with the nose 27 of the asymmetrical hook tip 23.

This cut 28 goes over into a recess 29.

The location of the transition of the cut 28 into the recess 29 can be formed as a bar prolonging the bevel surface 26.

The beginning of the cut 28 is closer to the cylindrical disk 21 than the end of this cut 28.

It is preferred that the opening, the slot-shaped recess 24 and the recess 29 open to the same side, and that the end eye 20 has a plane of symmetry.

The nose 27 of the asymmetrical hook tip 23 can have two parallel opposite, symmetrically arranged surfaces.

The nose 27 and the rear wall 30, which is opposite to the nose 27, taper into a rounded thorn 31.

The end point of the thorn 31 is located in-between the theoretical extension of this rear wall 30 of the tap 22 and the middle axis of the end eye 20.

The tip of the thorn 31 and the tip of the nose 27 are located on the plane of symmetry of the end eye 20 and on different sides with regard to the middle axis of the end eye 20.

It is preferred that the flank of the thorn and the back of the nose are in a blunt angle to each other.

The end eye 20 preferably is made of a thermoplastic material, for example polyoxymethylene (POM).

Figure 10:
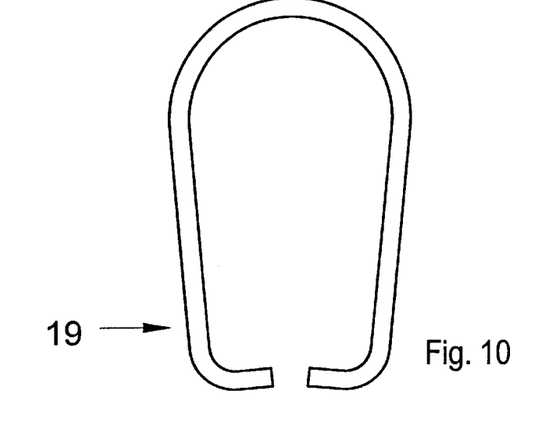
FIG. 10 shows a view of a hanger 19.

The hanger 19 preferably has the shape as shown in FIG. 10 and is made of metal.

The following example illustrates the invention. Thereby the assembly of the single parts as well as the adjustment of the spring scale is described.

EXAMPLE

The inner tube 4 made of polyoxymethylene (POM) in an injection moulding process has a total length of 116.5 mm and an outside diameter of 9.1 mm. At the circulating cylindrical, concentric, 4 mm long thickening 5 the outside diameter is 9.5 mm. Into this thickening 5 is cut a 0.5 mm deep, circulating groove 6, in which is inserted an adapted, red O-ring 7, in accordance with FIG. 11, step A. The end of the inner tube 4, which is opposite to the thickening 5, has a bottom with a centric whole 8 having a diameter of 4.1 mm.

The transparent cylindrical outer tube 1 made of polyoxycarbonate (PC) in an injection moulding process has a total length of 152.8 mm and an outside diameter of 12.2 mm. The outer tube 1 has on one end a protruding, circulating 4 mm long collar 49 with an outside diameter of 13.5 mm. The collar 49 has two opposite holes 3 with a diameter of 1.8 mm and at its inner wall a recess. The end of the outer tube 1, opposite to the collar 49, has on its inside a circulating constriction 2 with an inside diameter of 9.4 mm. The outer tube 1 has on its outside two imprinted, opposite 100 mm long scales from 0 g to 100 g.

Figure 11:
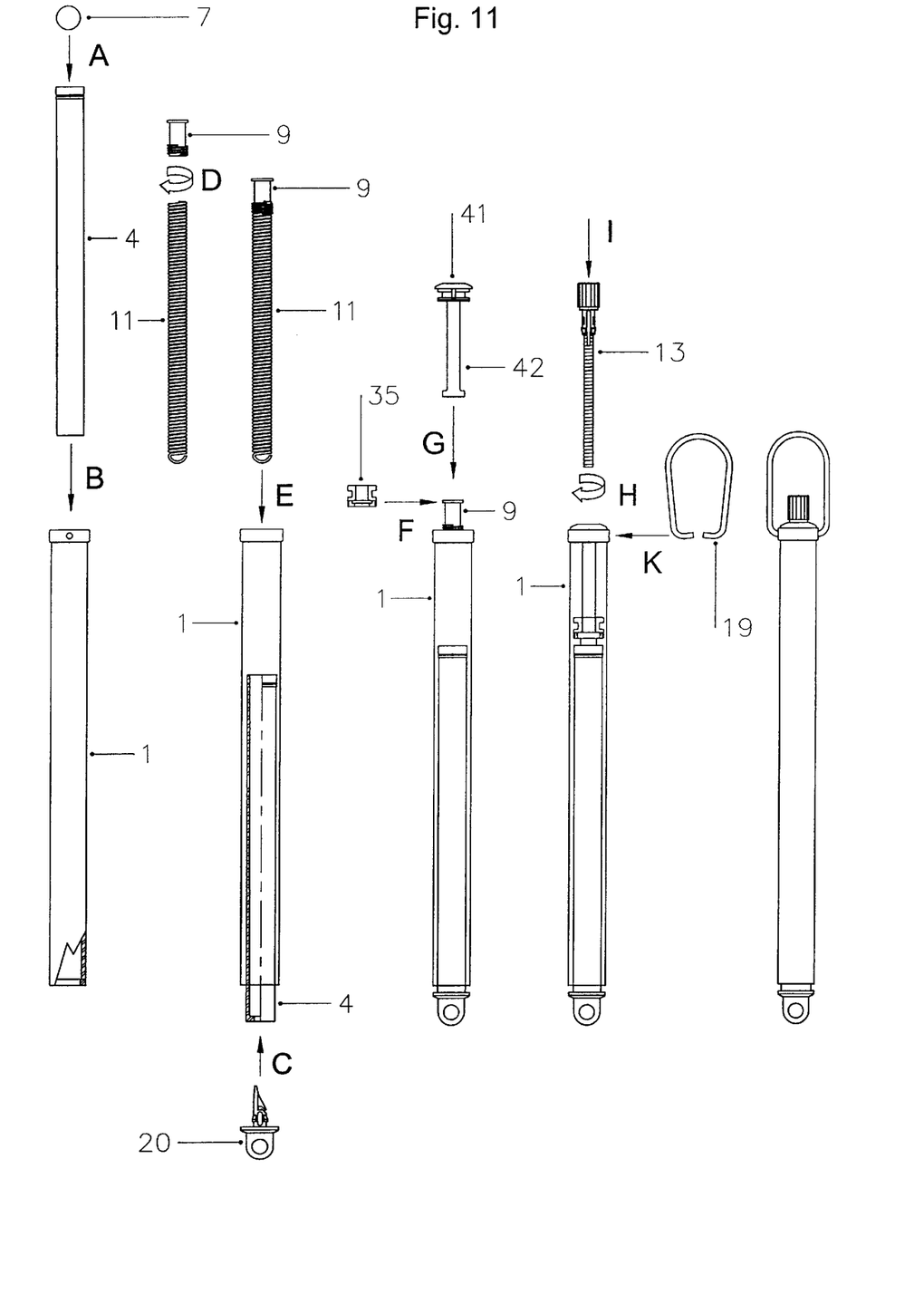
FIG. 11 schematically shows all individual parts in the same scale and their sequence of assembly with the steps A to K, which are shown with arrows.

The inner tube 4 is inserted with the bottom ahead into the outer tube 1 from the side with the two holes 3, according to FIG. 11, step B.

Figure 5A:
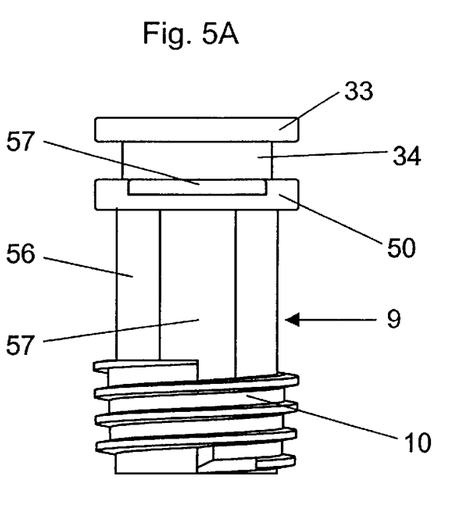
FIGS. 5A and 5B show side views of a spring holder 9.
Figure 5B:
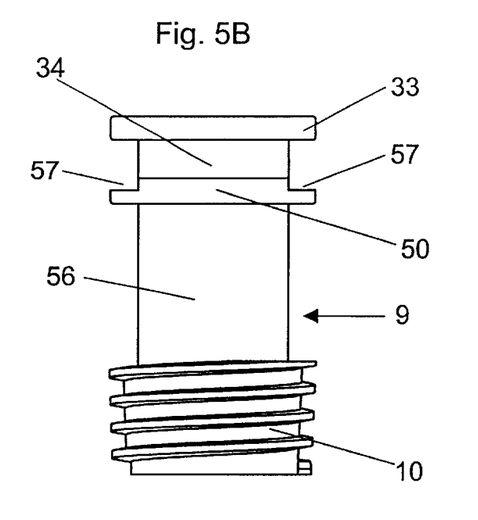
Figure 5C:
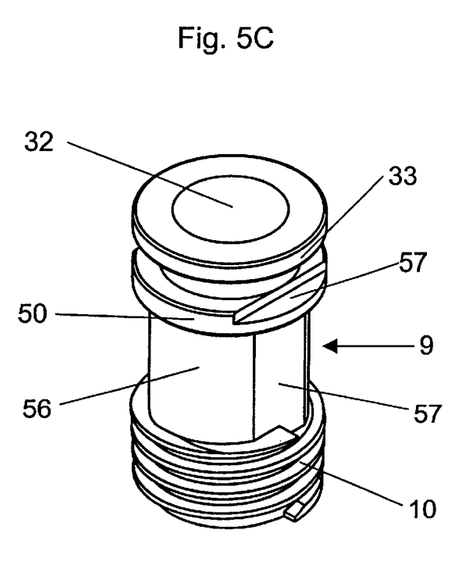
FIG. 5C shows an isometric view of a spring holder 9.
Figure 6:
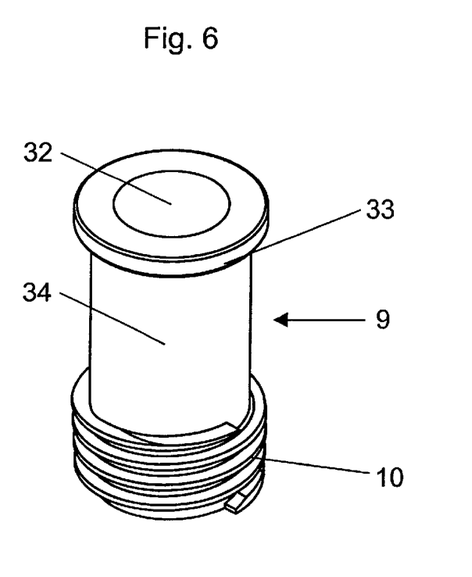
FIG. 6 shows an isometric view of another embodiment of a spring holder 9.
Figures 7A, 7B, 7C, 7D:
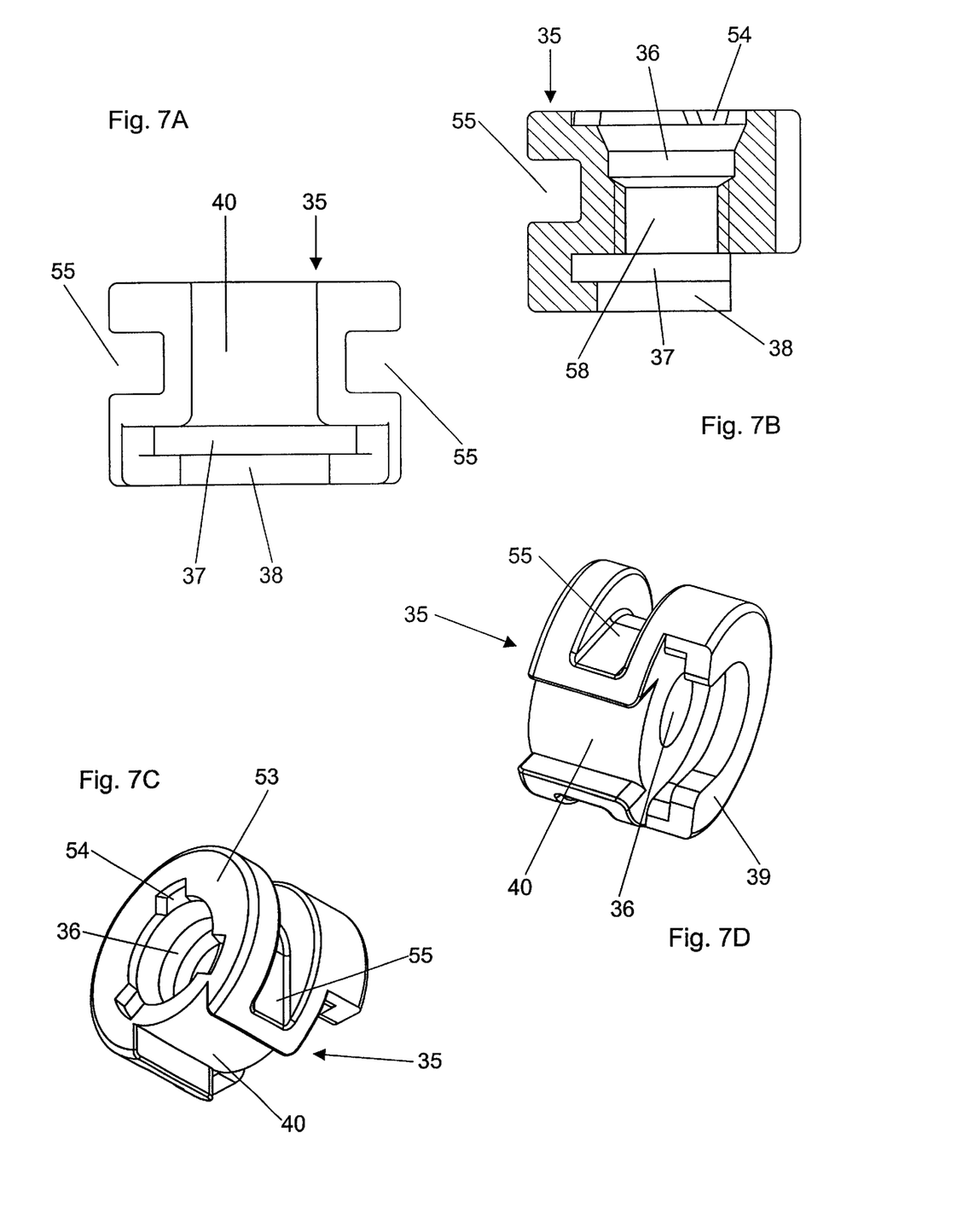
FIG. 7A shows a side view of a holder bearing 35.
FIG. 7B shows a cut through a holder bearing 35.
FIGS. 7C and 7D show isometric views of a holder bearing 35.

The spring holder 9 made of polyoxymethylene (POM) in an injection moulding process has a total length of 12 mm and a cylindrical basic shape. In its interior the spring holder 9 has a cylindrical axial drilling 32 with a diameter of 4.1 mm. The spring holder 9 has on one end a 0.8 mm long, circulating first flange 33 with a diameter of 6.7 mm. To this first flange 33 is adjacent a 1.3 mm long, first cylindrical section 34 with a diameter of 5 mm. To this first cylindrical section 34 is adjacent a 1 mm long second flange 50 with a diameter of 6.7 mm. To this second flange 50 is adjacent a 5.1 mm long, second cylindrical section 56 with a diameter of 5.6 mm. The second flange 50 and the second cylindrical section 56 each have two parallel flattenings 57 which are arranged symmetrically to the middle axis of the spring holder 9. The distance between these flattenings 57 is each 5 mm. At the end of the spring holder 9, opposite to the first flange 33, is located an outer thread 10 with a diameter of 6.7 mm and with four turns of thread with a taper of 0.9 mm.

The cylindrical spiral spring 11 is made of round wire and has a length of 112 mm, a wire strength of 0.39 mm, a number of windings of 120, an inner diameter of 5.6 mm and is on one side equipped with a semicircular eye 12. This spiral spring 11 has a weighing capacity from 0 g to 120 g.

The spiral spring 11 is screwed in and clamped on the side without tip-stretched semicircular eye 12 with at first five turns into the outer thread 10 of the spring holder 9, according to FIG. 11, step D. The spiral spring 11 is then adjusted in conventional manner for said measuring range by testing the capacity of the spring with a calibrated weight and, depending on the divergence of the given capacity of the scale, by screwing in more or less additional turns of the spiral spring into the spring holder 9.

The end eye 20 made of polyoxymethylene (POM) in an injection moulding process has a cylindrical disk 21 with a diameter of 12 mm and a thickness of 2 mm. On one side of this disk 21 is located a 3 mm thick and 9 mm long strap with an opening, having a diameter of to 5 mm. The middle axis of the end eye 20 goes through the center of the cylindrical disk 21 and is rectangular to it. On the other side of this disk 21 is located a cylindrical and concentric tap 22 with a diameter of 4 mm and a length of 14 mm. This tap 22 goes over into an asymmetrical hook tip 23. This tap 22 has a slot-shaped, 4.6 mm long and a 2 mm wide recess 24 with semicircular ends. The remaining walls of the tap 22 impart elastic characteristics. On the outer side of the tap 22 are located two opposite, wedge-shaped cams 25. The distance between the cams 25 and the cylindrical disk 21 is 1.6 mm. The tap 22 has an one sided bevel surface 26 with a length of 2.7 mm, which forms a cut 28 together with the 2.2 mm wide nose 27 of the asymmetrical hook tip 23. The cut 28 is 0.65 mm thick. This cut 28 goes over into a 1.3 mm high and 1 mm wide recess 29. The nose 27 and the rear wall 30 of the asymmetrical hook tip 23 opposite to the nose 27 taper to a rounded thorn 31.

The end eye 20 is inserted with the thorn 31 ahead into the centric hole 8 of the pre-assembled inner tube 4, according to FIG. 11, step C and is permanently fixed by the cams 25 in the bottom of the inner tube 4.

The cylindrical spiral spring 11 with the pre-assembled spring holder 9 is inserted and pressed in with the semicircular eye 12 ahead, into the pre-assembled inner tube 4, according to FIG. 11, step E. Thereby the thorn 31 grips in one side of the tip-stretched semicircular eye 12 of the spiral spring 11, whereby the semicircular eye 12 compulsory slides over the bevel nose 27 and under tension moves through the cut 28 and finally irrevocably interlocks into the recess 29 of the end eye 20.

The holder bearing 35 made of polyoxymethylene (POM) in a injection moulding process has a cylindrical basic shape with a diameter of 9.9 mm and a height of 7 mm. The holder bearing 35 has a continuous axial and centric hole 36. This hole 36 comprises a conic entering, which turns into a 2.5 mm long M4 inner thread 58, which is adjusted to the set screw 13.

This M4 inner thread 58 is limited by an U-shaped slot 37, which is rectangular to the middle axis of the holder bearing 35, is 0.9 mm thick and has a diameter of 6.9 mm. This U-shaped slot 37 is limited by an also U-shaped, 1.1 mm thick recess 38 with Et diameter of 5.1 mm. The centers of the semi-circles of the U-shaped slot 37 and of the U-shaped recess 38 are located on the middle axis of the holder bearing 35. The two thighs of the U-shaped slot 37 and the two thighs of the U-shaped recess 38 are all parallel. The U-shapes of the slot 37 and of the recess 38 open to the same side. One side of the U-shaped recess 38 forms the end surface 39 which is rectangular to the middle axis of the holder bearing 35. Over the cylindrical outer wall of the holder bearing 35 and parallel to its middle axis is located a 4.3 mm wide, 5 mm long and 1.4 mm deep, continuous channel 40, which is located in the center of the opening of the U-shaped slot 37. The non lateral limitation surface has a shape concentric to the cylindrical basic shape of the holder bearing 35. A circulating groove 55 is cut into the cylindrical outer wall of the holder bearing 35.

The cover 41 made of polyoxymethylene (POM) in a injection moulding process is 37.8 mm long, has a 1.8 mm thick, rounded end cap 43 with a diameter of 12.1 mm and a 4.1 mm high cylindrical lower part 45 with a diameter of 10.5 mm. This lower part 45 has a circulating 2 mm high groove 46, which is interrupted by two opposite bars, whereby one of these bars 47 is protruding. The cover 41 has a continuous, axial, centric and ten-angular hole 48 with an inside diameter of 4.1 mm. The cover 41 also comprises a tip-stretched, in total 31.9 mm long, 4.1 mm wide and 1.4 mm thick spur 42, which is parallel to the middle axis of the cover 41. The outer wall of the spur 42 has a radius of 5.1 mm, and the inner wall is concentric to the outer wall. The end of the spur 42, which is opposite to the end cap 43, has a 7.2 mm wide and 2 mm high thickening 51.

The pre-assembled spring holder 9 is pulled out of the inner tube 4 and the first flange 33 is radially shifted over the U-shaped slot 37 of the holder bearing 35, according to FIG. 11, step F. Subsequently the spur 42 is inserted into the channel 40 of the holder bearing 35, and the so assembled parts are inserted into the outer tube 1 and twisted until the protruding bar 47 at the cover 41 locks into the corresponding recess in the inner wall of the outer tube 1. Subsequently the cover 41 is shifted completely into the outer tube 1, according to FIG. 11, step G.

The set screw 13 made of polyoxymethylene (POM) in a injection moulding process comprises a 44 mm long M4 thread 14, which is adapted to the M4 inner thread 58 of the holder bearing 35, a 9 mm long, grooved, cylindrical screw head 15 with a diameter of 6.8 mm and an in-between located 8.6 mm long cylindrical section 16 with a diameter of 4.0 mm. The screw head 15 has on the side opposite to the thread 14 a 8 mm deep, axial, centric sack hole with a diameter of 3 mm. The cylindrical section 16 has a 11.9 mm long, slot-shaped recess 17, which imparts elastic characteristics to the remaining walls. The cylindrical part 16 has adjacent to the thread 14 two opposite cams 18. The remaining walls have two opposite, protruding olives 52.

The set screw 13 is shifted into the hole 48 of the pre-assembled cover 41, until the thread 14 hits the M4 inner thread 58 of the holder bearing 35. The set screw 13 is screwed in for about 20 mm into the M4 inner thread 58 of the holder bearing 35, according to FIG. 11, step H. Subsequently the set screw 13 is fully pressed into the cover 41, according to FIG. 11, step 1, and is permanently held in the cover 41 by means of the elastic cams 18, which are present on the set screw 13.

The hanger 19 is made of round steel wire with a diameter of 1.7 mm, is symmetrical, flat and U-shaped. The semicircular rounding has a radius of 10 mm and the two adjacent thighs have a length of 20 mm. In a non assembled state the thighs are slightly concur, having an initial tension, in order to be parallel in an assembled state. The ends of the two thighs are symmetrical and are bent rectangulary towards each other and are each 6 mm long.

The thighs of the hanger 19 are somewhat opened, and the ends of the two thighs are inserted according to FIG. 11, step K, into the holes 3 in the outer tube 1, in a way that they interlock into the groove 46 in the cover 41 and permanently secure it in the outer tube 1.

For holding or suspending of the weighing goods a common clip or hook is attached to the opening in the end eye 20.

This spring scale is operated as follows:

The spring scale is vertically hung up at its hanger 19 or is steadily held with two fingers on the hanger 19.

Prior to each measurement with or without tare the zero point has to be checked and if necessary has to be adjusted with the set screw 13.

The weighing goods are attached or given into a tared container. Subsequently the weight is read on the scale.

In the present invention the following reference numerals are used:

| 1 | outer tube |
|---|---|
| 2 | constriction |
| 3 | holes (hole) |
| 4 | inner tube |
| 5 | thickening |
| 6 | groove |
| 7 | O-ring |
| 8 | hole |
| 9 | spring holder |
| 10 | outer thread |
| 11 | spiral spring |
| 12 | semicircular eye |
| 13 | set screw |
| 14 | thread |
| 15 | screw head |
| 16 | cylindrical section |
| 17 | slot-shaped recess |
| 18 | cam |
| 19 | hanger |
| 20 | end eye |
| 21 | disk |
| 22 | tap |
| 23 | hook tip |
| 24 | recess |
| 25 | cam |
| 26 | bevel surface |
| 27 | nose |
| 28 | cut |
| 29 | recess |
| 31 | thorn |
| 32 | drilling |
| 33 | circulating flange |
| 34 | cylindrical section |
| 35 | holder bearing |
| 36 | hole |
| 37 | U-shaped slot |
| 38 | U-shaped recess |
| 39 | end surface |
| 40 | channel |
| 41 | cover |
| 42 | spur |
| 43 | end cap |
| 44 | edge |
| 45 | lower part |
| 46 | cavities |
| 47 | means |
| 48 | hole |
| 49 | collar |
| 50 | second flange |
| 51 | thickening |
| 52 | olive |
| 53 | front side |
| 54 | notch |
| 55 | circulating groove |
| 56 | second cylindrical section |
| 57 | flattening |
| 58 | inner thread. |

What is claimed is:
1. Spring scale, comprising:
an outer tube (1), which has on one end on its inner side a circulating constriction (2) and on the other end two opposite holes (3) as well as means to avoid distortion,
an inner tube (4), which is cylindrical on its outer side and which has one end a bottom with a centric hole (8), and which has on its other end a circulating cylindrical concentric thickening (5), in which a circulating groove (6) is embedded, in which an )-ring (7) with marking function is inserted,
the inner tube (4) is inserted with said bottom ahead into the outer tube (1) from the side with the said holes (3),
an eye, which is inserted and held in the hole (8) in the bottom of the inner tube (4),
a spring holder (9) with outer thread (10),
a cylindrical spiral spring (11) on one side equipped with a semicircular eye (12), the spiral spring (11) on its side without said semicircular eye (12) is screwed into the outer thread (1) of the spring holder (9), a set screw (13) with a thread (14), a handy shaped screw head (15) and a cylindrical section (16), which is located in-between them, the cylindrical section (16) has a slot-shaped recess (17), which imparts elastic behaviour characteristics to the remaining walls, and which has on the side of the thread (14) at least two opposite cams (18), the outer diameter of the screw head (15) is larger near the transition to the cylindrical section (16) than the outer diameter of the cylindrical section (16) itself, and the outside diameter of the cylindrical section (16) is larger or equal to the outer diameter of the thread (14) near the transition to the thread (14), and a hanger (19), characterized in that the eye is an end eye (20), which comprises a cylindrical disk (21), and the middle axis of the end eye (20) goes through the center of this cylindrical disk (21) and is rectangular to it, on one side of this cylindrical disk (21) an element is located, which enables the mounting of a supporting device, on the other side of this cylindrical disk (21), a cylindrical and concentric tap (22) is located, which passes over into an asymmetrical hook tip (23) and having a slot-shaped recess (24), at the outside of the tap (22) are located at least two opposite cams (25), there is a space between the cams (25) and the cylindrical disk (21), and the remaining walls of the tap (22) with cams (25) impart elastic behaviour characteristics to the remaining walls, the tap (22) has on one side a bevel surface (26), which forms together with the nose (27) of the symmetrical hook top (23) a cut (28), this cut (28) turns into a recess (29), and the beginning of this cut (28) is closer to the cylindrical disk (21) than the end of this cut (28), the nose (27) and the rear wall (30) opposite to the nose (27) of the asymmetrical hook top (23) taper to a rounded thorn (31), the end point of the thorn (31) is located between the theoretical extension of this rear wall (30) of the tap (22) and the middle axis, and the tip of the thorn (31) and the tip of the nose (27) are located on the symmetry plane of the end eye (20) and on different sides with regard to the middle axis of the end eye (20), the end eye (20) with the thorn (31) ahead is inserted into the centric hole (8) in the bottom of the inner tube (4) and is held permanently on the bottom of the inside of the inner tube (4) by means of the cams (25)

the spring holder (9) has a cylindrical basic form and has a cylindrical axial drilling (32) in its interior and has on one end a circulating flange (33), this flange (33) has an adjacent cylindrical section (34), and at the other end of the spring holder (9) is located an outer thread (10), the cylindrical spiral spring (11) is screwed and clamped into the spring holder (9) and is inserted, with the semicircular eye (12) ahead, into the inner tube (4) in such a way that the semicircular eye (12) is hung up irrevocably in the recess (29) of the end eye (20), that a holder bearing (35) is present, which has a cylindrical basic form with a continuous axial and centric hole (36), which has different diameters along the middle axis of the holder bearing (35), according to a first variation an inner thread (58) extends over a part of the length of this hole (36), or according to a second variation is located a slot with two parallel sides and at least two edges, this slot can receive a many-sided nut which is secured against rotation, and this slot is located between a U-shaped slot (37) and the front side (53) of the holder bearing (35), said inner thread (58) ends at said U-shaped slot (37), which is rectangular to the middle axis of the hole (36) in the holder bearing (35), the center of the semi-circle of the U-shaped slot (37) is located on the middle axis of the holder bearing (35), this U-shaped slot (37) ends in a U-shaped, smaller recess (38), the center of the semi-circle of the U-shaped recess (38) is also located on the middle axis of the holder bearing (35), the two thighs of the U-shaped slot (37) and the two thighs of the U-shaped recess (38) are all parallel, the U-form of the slot (37) and the U-form of the recess (38) open towards the same side, the radius of the U-shaped slot (37) is larger than the radius of the U-shaped recess (38), one side of this U-shaped recess (38) forms the end surface (39) which is rectangular to the middle axis of the hole (36) in the holder bearing (35), a continuous channel (40) extends over the cylindrical outer wall of the holder bearing (35) and is parallel to its middle axis, the holder bearing (35) at the location of its U-shaped slot (37) is radially put over the flange (33) of the spring holder (9), and the spring holder (9) is centric and freely swivelling in the holder bearing (35), that a cover (41) with spur (42) is present, the cover (41) has an end cap (43) with a protruding, circular edge (44) and a cylindrical lower part (45), the cylindrical lower part (45) has re-entrant cavities (46) and means against involuntary rotation, the cover (41) has a continuous, axial and centric hole (48) and parallel to the middle axis of the cover (41) a rod-shaped spur(42), the means against involuntary rotation in the outer tube (1) and the cover (41) are adjusted to each other and are interlocking, the spur (42) is inserted into the channel (40) of the holder bearing (35) and the spur (42), together with the holder bearing (35) and the spring holder (9) are all located in the outer tube (1) and are held together by it, and the protruding, circulating edge (44) of the end cap (43) is resting on the front side of the collar (49) of the outer tube (1), the holder bearing (35) and the inserted spur (42) nearly completely fill the interior space of the outer tube (1), the thread (14) of the set screw (13) and the thread of the holder bearing (35) are adjusted to each other and are screwed together, the diameter of the cylindrical axial drilling (32) in the spring holder (9) is slightly larger than the outside diameter of the thread (14) of the set screw (13), and thus the spring holder (9) is not hindered in its swivellingness by the thread (14) of the set screw (13), the cylindrical section (16) of the set screw (13) is located in the hole (48) of the cover (41), the set screw (13) remains swivellable and is axially locked by the cams (18) of the set screw (13) in the cover (41), the rotation of the screw head (15) initiates a sliding of the holder bearing (35) along the spur (42), and the holder bearing (35) simultaneously convects axially the spring holder (9) with all parts attached to it, and thus warranties the zero point adjustment and the tare function of the spring scale, and the hanger (19) goes through the holes (3) in the outer tube (1) and engages to the re-entrant cavities (46) in the cover (41) and thus fixes the cover (41) in the outer tube (1).

2. Spring scale according to claim 1, characterized in that the means against involuntary rotation in the outer tube (1) comprise at least one cavity for receiving at least one protruding bar (47) in the cover (41).

3. Spring scale according to claim 1, characterized in that the outer tube (1) has on the side with the two holes (3) a final, protruding, circulating collar (49) with reinforcement function, whereby these holes (3) are located in the collar (49).

4. Spring scale according to claim 1, characterized in that the outer thread (10) in the spring holder (9) has from two to eight, especially three to four turns of the tread, and that the inner diameter of the first turn of the thread is smaller than the last turn of the thread.

5. Spring scale according to claim 1, characterized in that there is a second flange (50) on the spring holder (9) between the circulating flange (33) and the outer thread (10).

6. Spring scale according to claim 1, characterized in that the channel (40) which is present in the holder bearing (35) has two opposite parallel lateral limiting surfaces, that the non-lateral limiting surface of this channel (40) has a shape, which is concentric to the cylindrical basic form of the holder bearing (35), and that this channel (40) is located in the middle of the opening of the U-shaped slot (37).

7. Spring scale according to claim 1, characterized in that the re-entrant cavities (46) in the cover (41) with spur (42) have the shape of a groove, which is interrupted by two opposite bars, whereby one of these bars (47) serves as means against involuntary rotation.

8. Spring scale according to claim 1, characterized in that the continuous, axial and centric hole (48) which is present in the cover (41) is polygonal.

9. Spring scale according to claim 1, characterized in that the spur (42) is rod-shaped and adapted to the form of the inner wall of the outer tube (1) and is a part of the cover (41).

10. Spring scale according to claim 1, characterized in that the end of the spur (42), which is located opposite to the end cap (43), has a thickening (51), which has the function of a stop gauge for the holder bearing (35).

11. Spring scale according to claim 1, characterized in that the spiral spring (11) screwed and clamped into the outer thread (10) of the spring holder (9) is fixed additionally by gluing or welding onto the outer thread (10) or fixed by an O-ring on the cylindrical section (34, 56).

12. Spring scale according to claim 1, characterized in that the cover (41) is connected with the outer tube (1) by means of gluing or welding in such a way that a separation of these parts (41),(1) is only possible by destruction.

13. Spring scale according to claim 1, characterized in that the continuous, axial and centric hole (48) which is present in the cover (41) is ten-angular.

* * * * *